(12) United States Patent
Bemanian et al.

(10) Patent No.: US 7,233,604 B1
(45) Date of Patent: Jun. 19, 2007

(54) TIME DIVISION MEDIA ACCESS CONTROLLER AND METHOD OF OPERATION THEREOF

(75) Inventors: Majid Bemanian, Pleasanton, CA (US); Narayanan Raman, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 1033 days.

(21) Appl. No.: 10/162,504

(22) Filed: Jun. 4, 2002

(51) Int. Cl.
*H04J 3/00* (2006.01)
*H04L 12/56* (2006.01)

(52) U.S. Cl. ............... 370/498; 370/419; 370/420

(58) Field of Classification Search ........ 370/336–337, 370/419–420, 463, 468, 498, 502, 532–537
See application file for complete search history.

(56) References Cited

U.S. PATENT DOCUMENTS

| | | | | |
|---|---|---|---|---|
| 5,345,447 A | * | 9/1994 | Noel | 370/362 |
| 5,594,727 A | * | 1/1997 | Kolbenson et al. | 370/442 |
| 5,687,310 A | * | 11/1997 | Rotker et al. | 714/11 |
| 5,909,564 A | * | 6/1999 | Alexander et al. | 710/316 |
| 6,373,848 B1 | * | 4/2002 | Allison et al. | 370/401 |
| 6,539,488 B1 | * | 3/2003 | Tota et al. | 713/400 |
| 6,876,561 B2 | * | 4/2005 | Wolrich et al. | 365/49 |

* cited by examiner

*Primary Examiner*—Chi Pham
*Assistant Examiner*—Saba Tsegaye
(74) *Attorney, Agent, or Firm*—Hitt Gains, PC

(57) ABSTRACT

A time division media access controller for use with a multi-port data switch and a method of controlling media access. In one embodiment, the time division media access controller includes a time division receive engine, a time division transmit engine and a time division arbiter coupled to the time division receive and transmit engines. The time division receive engine accepts data from a plurality of data ports and the time division transmit engine provides data to a plurality of data ports. The time division arbiter controls states of the time division receive and transmit engines based on throughput requirements of the data. In preferred embodiments, the time division media access controller complies with the IEEE 802.3 ethernet standard.

21 Claims, 3 Drawing Sheets

TIME DIVISION MEDIA ACCESS CONTROLLER AND METHOD OF OPERATION THEREOF

TECHNICAL FIELD OF THE INVENTION

The present invention is directed, in general, to controlling media in networks and, more specifically, to a time division media access controller.

BACKGROUND OF THE INVENTION

Access on an Ethernet is governed by a device's Media Access Controller (MAC) which is a six-byte number that is unique to each Network Interface Card (NIC). Typical bridges and switches in a computer network learn which devices are on by learning the MAC addresses of devices attached to various ports in the network. By learning a topology map of a network, bridges and switches may quickly switch packets between communicating devices.

Currently, Ethernet communication is designed as a single stream of data. A single MAC, therefore, is used to process each individual data stream on each of the network ports. For example, if there are twenty four ports of Ethernet based data streams, then twenty four MACs process the traffic.

With twenty four MACs, an Ethernet switch is effectively processing each data stream in a parallel fashion. The parallel processing increases the complexity on the die area of each chip in an Ethernet switch. In addition to the number of MACs employed, several multiplexors are employed in addition to the internal bussing.

Even with existing switches, Ethernet die cost is expensive and very crucial. In addition, there are demands to work at higher levels of integration with twenty four ports being a starting point. Parallel processing of the data streams limits the increase in port processing that the market requires. Presently, the number of ports that may be processed by a single silicon chip is limited due to the available die area on the chip.

Accordingly, what is needed in the art is a way to process data on multiple ports using a low density device.

SUMMARY OF THE INVENTION

To address the above-discussed deficiencies of the prior art, the present invention provides a time division media access controller for use with a multi-port data switch. In a preferred embodiment, the time division media access controller complies with the IEEE 802.3 ethernet standard. In one embodiment, the time division media access controller includes a time division receive engine, a time division transmit engine and a time division arbiter coupled to the time division receive and transmit engines. The time division receive engine is configured to accept data from a plurality of data ports. The time division transmit engine is configured to provide data through a plurality of data ports. The time division arbiter is configured to control states of the time division receive and transmit engines based on throughput requirements of the data.

In another aspect, the present invention provides a method of controlling media access based on time division for use with a multi-port data switch. The method includes receiving time division multiplexed data from a plurality of data ports based on a receive state table coupled to a time division receive engine. The method also includes transmitting time division multiplexed data through a plurality of data ports based on a transmit state table couple to a time division transmit engine. Furthermore, the method includes arbitrating the receiving and the transmitting by controlling states of the time division receive and transmit engines based on throughput requirements of the data.

The present invention provides, in yet another aspect, a data switch. The data switch includes a switch engine coupled to an address table and a static dynamic random memory (SDRAM) interface coupled to the switch engine. The data switch also includes a multiplexer and a time division media access controller coupled to the switch engine and the multiplexer. The time division media access controller includes a time division receive engine, a time division transmit engine and a time division arbiter. The time division receive engine is coupled to a receive state table and accepts data from a plurality of data ports. The time division transmit engine is coupled to a transmit state table and provides data through a plurality of data ports. The time division arbiter is coupled to the receive and transmit state tables and controls states of the time division receive and transmit engines based on throughput requirements of the data.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
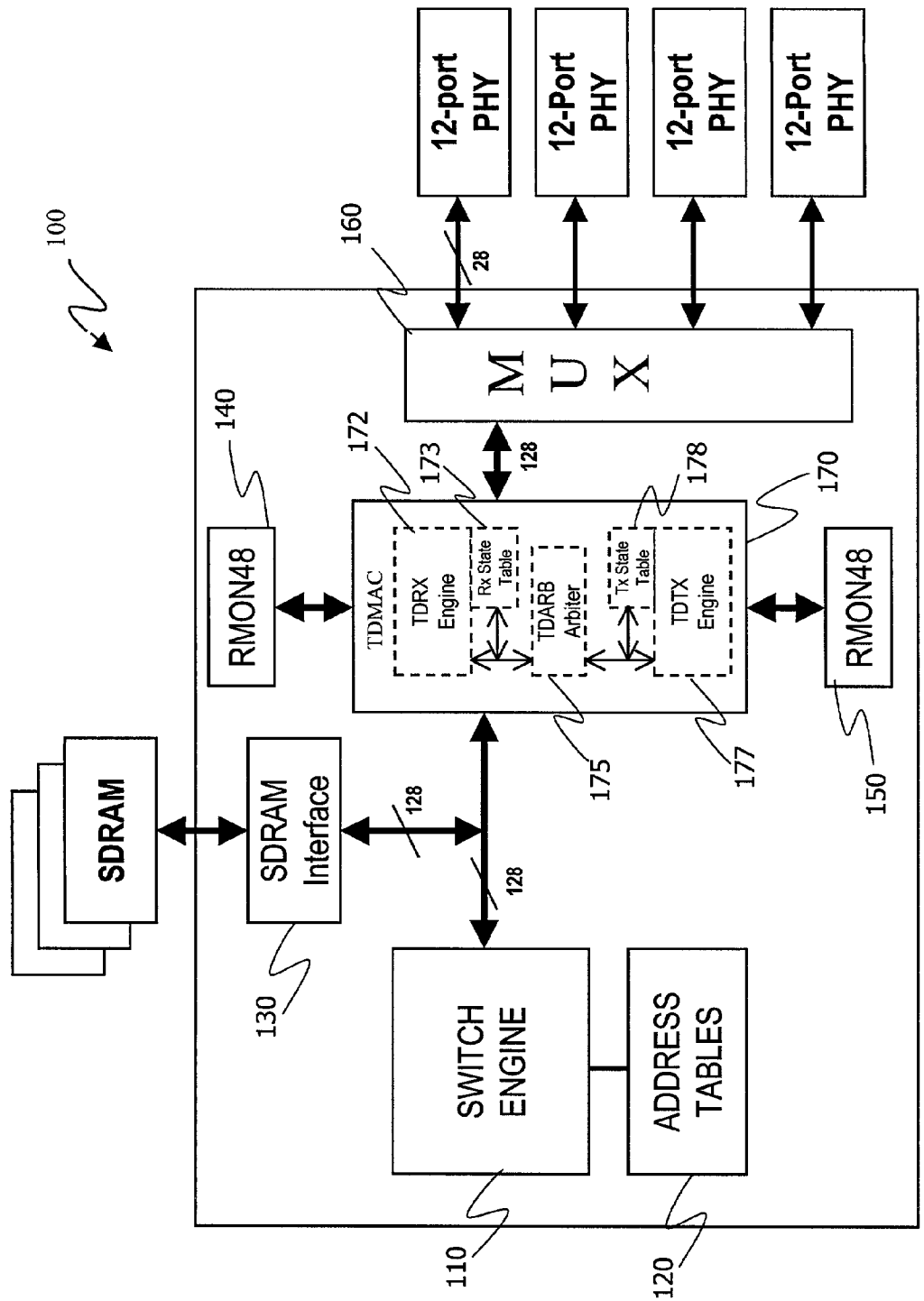
FIG. 1 illustrates a block diagram of an embodiment of a data switch constructed in accordance with the principals of the present invention.

Referring initially to FIG. 1, illustrated is a block diagram of an embodiment of a data switch, generally designated 100, constructed in accordance with the principals of the present invention. The data switch 100 includes a switch engine 110, an address table 120, a static dynamic random memory (SDRAM) interface 130, a first and second statistics register 140, 150, a multiplexer 160 and a time division media access controller 170. The time division media access controller 170 includes a time division receive engine 172, a receive state table 173, a time division arbiter 175, a time division transmit engine 177 and a transmit state table 178.

The switch engine 110 may be a conventional Data Link Layer (Layer 2 of the Open Systems Interconnect architecture) or Network Layer (Layer 3 of the Open Systems Interconnect architecture) switch engine. For example, the switch engine 110 may be a Layer 3 switch engine that employs the Internet Protocol (IP). In another embodiment, the switch engine 110 may be a Layer 3 switch engine that employs a routing protocol such as Transmit Control Protocol (TCP). In a preferred embodiment, the switch engines 110 complies with the IEEE 802.3 ethernet standard. The switch engine 110 examines received data and distributes the received data to a correct location. The switch engine 110 may determine to transmit the received data or write the received data into its memory. As illustrated, the memory of the switch engine 110 may be a SDRAM. One skilled in the art will understand the operation of the switch engine 110.

The address table 120 may be a conventional address table or routing table employed by the switch engine 110 to determine the appropriate port to which the data may be transmitted. The switch engine 110 searches the address table 120 for the stored entry that produces the best match of the destination address. The selected entry from the switch engine 110 then indicates the port number to which the data may be transmitted. One skilled in the art will understand the operation of the address table 120.

The SDRAM interface 130 provides an interface for the data switch 100 to a SDRAM. In the illustrated embodiment, the SDRAM interface 130 is coupled by a 128 bit wide bus to another 128 bit wide bus that couples the switch engine 110 to the time division media access controller 170. In other embodiments, the bus width may vary. For example, the bus widths may be a function of the number of ports, a media, such as the speed of an ethernet link, and a frequency of the operation of the time division media access controller 170. The SDRAM interface 130 is a conventional device that may provide a path for data from the switch engine 110 to the SDRAM.

The first and second statistics register 140, 150, may be blocks of memory which are used to collect information about the received and transmitted data that is processed through the data switch 100. The first and second statistics register 140, 150, may employ registers to track various statistics, that may include but not limited to, the number of packets, the size of packets and the type of errors that are present. In an advantageous embodiment, the first and second statistics register 140, 150, may employ conventional counters. The information stored by the first and second statistics register 140, 150, may be used by software at a higher level to determine the statistics of the data processed by the switch engine 110. The first and second statistics register 140, 150, may record the health of a network through remote monitoring.

The multiplexer 160 provides an interface between the time division media access controller 170 and a conventional physical layer (Layer 1 of the Open Systems Interconnect architecture). The multiplexer 160 may serialize and format per industry standards the data that is processing through the data switch 100. In a preferred embodiment, the multiplexer 160 may be a Serial Media Independent Interface (SMII). SMII is an industry standard interface card that one skilled in the art will understand.

The time division media access controller 170 performs the independent functions of receiving and transmitting the data which is processed by the data switch 100. In the time division media access controller 170, the received and transmitted data packets are processed by implementing time division multiplexing. By implementing time division multiplexing, the time division media access controller 170 may provide a single device for processing data on a number of ports. The number of ports to be processed may simply be a function of the speed of the time division media access controller 170. In a preferred embodiment, there may be about 48 ports to process. Of course, any number of ports are within the broad scope of the present invention.

The time division media access controller 170 may be a dedicated device that is constructed of special-purpose hardware employing a sequence of operating instructions, which directs its operation. In other embodiments, the time division media access controller 170 may be employed in a device that is solely hardwired or that is solely software enabled using general purpose hardware. In a preferred embodiment, the time division media access controller 170 may be implemented on a silicon chip.

Since the time division media access controller 170 may provide data processing for a number of ports, then the footprint of the data switch 100 may be reduced. As illustrated in FIG. 1, the time division media access controller 170 may permit further reduction of silicon area due to the reduction of busses for connecting the components of the data switch 100. For example, a single separate 128 bit wide bus may be used to connect the time division media access controller 170 to the switch engine 110. In addition, a 128 bit wide bus may also be used to connect the time division media access controller 170 to the multiplexer 160. As discussed above with respect to the SDRAM interface 130, the width of the various buses may vary in other embodiments. Thus the time division media access controller 170 may greatly increase the number of ports that may be processed by a single chip.

The time division media access controller 170 may perform time division multiplexing by using the time division arbiter 175. The time division arbiter 175 works with the receive state table 173 and the transmit state table 178 to receive and transmit data through the time division receive engine 172 and the time division transmit engine 177. In an advantageous embodiment, the time division arbiter 175 may employ a round-robin architecture. The operation of the time division media access controller 170 will be discussed in more detail below with respect to FIG. 2.

In an advantageous embodiment, the time division media access controller 170 may send control signals to the multiplexer 160. The control signals may be used as handshake signals to indicate that data is being sent to the multiplexer 160 from the switch engine 110. The multiplexer 160 may use the control signals to properly format the data stream from the switch engine 110 before a stream of data is sent to the physical layer. In another embodiment, the time division media access controller 170 may also send port information to the switch engine 110 to assist in processing the data.

Figure 2:
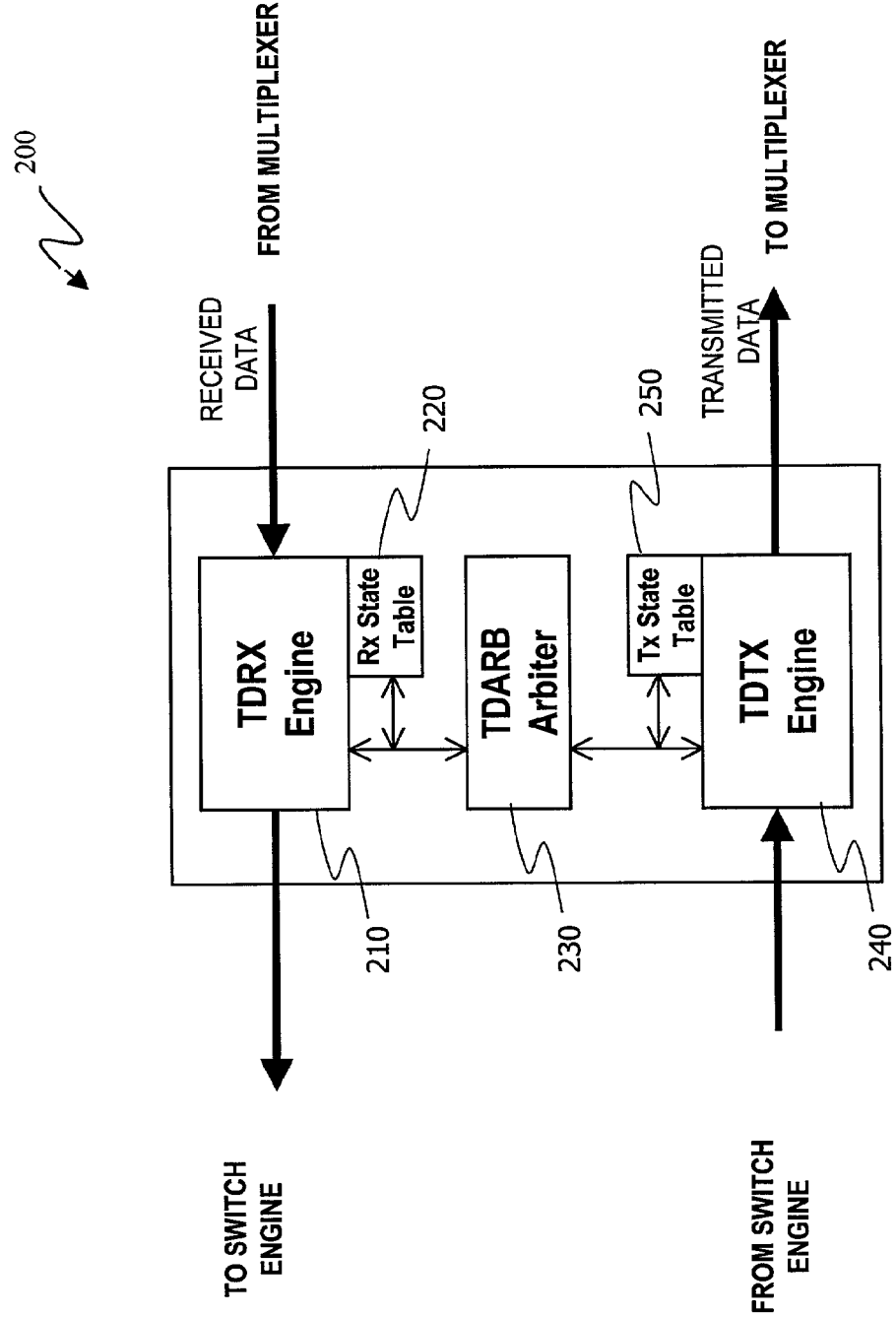
FIG. 2 illustrates a block diagram of an embodiment of a time division media access controller constructed in accordance with the principals of the present invention.

Turning now to FIG. 2, illustrated is a block diagram of an embodiment of a time division media access controller, generally designated 200, constructed in accordance with the principals of the present invention. The time division media access controller 200 includes a time division receive engine 210, a receive state table 220, a time division arbiter 230, a time division transmit engine 240 and a transmit state table 250. In one embodiment, the time division media access controller 200 may be coupled to a Layer 2 or Layer 3 switch.

As illustrated in FIG. 2, the time division receive engine 210 may receive data packets from a multiplexer that has serialized the data that was received at a physical layer. The physical layer may have a plurality of ports, for instance, about 48 ports for an ethernet operating at about 100 Mbps. The time division receive engine 210 may be a dedicated device that is constructed of special-purpose hardware employing a sequence of operating instructions, which directs its operation. In a preferred embodiment, the time division receive engine 210 is implemented on a silicon chip. The time division receive engine 210 processes the received data packets based on an address of a particular frame of the received data. The time division receive engine 210 may determine to send the received data to a switch engine if the particular frame address matches correctly or simply stop processing the received data packets if the particular frame address does not match. In some embodiments, the data packets may be associated with an Internet Protocol (IP) or Transmit Control Protocol (TCP) structure. In a preferred embodiment, the data packets may be IEEE 802.3 ethernet frames.

In a preferred embodiment, the time division media access controller 200 may be implemented in an Ethernet switch. In this embodiment, the time division receive engine 210 may remain in an idle state until a physical layer device senses valid data on the media. When the physical layer device senses there is valid data, the time division receive engine 210 may move from the idle state to a receive valid data state. When in this state, a first piece of information that may be received by the time division receive engine 210 is a header. In some embodiments, the header may be stripped by the physical layer device and used to synch-up with data coming through the media. In other embodiments, the physical layer device does not strip the header but simply propagates it to time division media access controller 200 where it may be stripped by the time division receive engine 210. Once the header is stripped, the time division receive engine 210 collects the data and checks the data packets by performing a cyclic redundancy check. In some embodiments, the data packet may include a pad that was added if the data packet was less than 64 bytes. In this instance, the pad is stripped before performing the cyclic redundancy check. In the preferred embodiment, the time division receive engine 210 also performs address matching of the data packet to determine if the data packet is destined for the time division media access controller 200.

The receive state table 220 may provide storage for the state of each particular port. The receive state table 220 may be coupled to the time division receive engine 210 and store the initial state of each port and a new state of each port after processing by the time division receive engine 210. In one embodiment, the receive state table 220 may be implemented by employing conventional registers. In another embodiment, the receive state table 220 may employ random access memory.

The time division arbiter 230, which may be coupled to the receive state table 220 and the transmit state table 250, controls the processing of the received data packets and the transmitted data packets by the time division receive engine 210 and the time division transmit engine 240, respectively. For an example of processing received data, the time division arbiter 230 may determine to examine the condition of a particular port such as port 1. The time division arbiter 230 sets a timer which monitors the duration of processing the data at port 1. The time division arbiter 230 starts the timer and loads the initial state of port 1 which is stored in the receive state table 220 into the time division receive engine 210. Once the allotted time for processing port 1 has expired, the time division arbiter 230 removes the state of port 1 from the time division receive engine 210 and writes the new state to the receive state table 220. The time division arbiter 230 may then proceed to the next port and begin processing.

In some embodiments, the time division arbiter 230 may perform multiple iterations of the above example to process a single frame of data at a port. In an advantageous embodiment, the time division arbiter 230 may employ a round-robin architecture. The time division arbiter 230, therefore, may insure that statistics of a particular port are maintained. In yet another advantageous embodiment, the time division arbiter 230 maintains the port statistics within the receive state table 220. The example above discussed the time division arbiter 230 controlling the received data packets. In a similar fashion, the time division arbiter 230 may also control transmitted data packets by controlling the time division transmit engine 240 and the transmit state table 250. In a preferred embodiment, the time division arbiter 230 may control receiving and transmitting data through the time division media access controller 200 by connections to the time division receive engine 210 and the receive state table 220 and the time division transmit engine 240 and transmit state table 250.

The time division transmit engine 240 may send transmitted data packets to a multiplexer that receives serialized data. The time division transmit engine 240 may be a dedicated device that is constructed of special-purpose hardware employing a sequence of operating instructions, which directs its operation. In a preferred embodiment, the time division transmit engine 240 is implemented on a silicon chip. Depending on how the time division media access controller 200 is implemented, the time division transmit engine 240 may send the transmitted data packets to a serial multiplexer of a switch engine. The data packets may be sent via a 128 bit wide data bus.

In a preferred embodiment, the time division transmit engine 240 may be implemented in a Ethernet switch. In the preferred embodiment, for example, the time division transmit engine 240 may begin to transmit a header of a data packet which entered the time division transmit engine 240. In one embodiment, the time division transmit engine 240 may delay transmitting if it senses a collision. In an advantageous embodiment, the time division transmit engine 240 may transmit when the media is idle to prevent collisions. The time division transmit engine 240 may pad a frame of the data packet with zeros if the data frame is less than 64 bytes. The time division transmit engine 240 may also perform a cyclic redundancy check of the data frame before the data frame is transmitted. The cyclic redundancy check may be a conventional 32 bit cyclic redundancy check. The cyclic redundancy check may be calculated over the entire data frame and attached to the end of the data frame. The calculated value may then be transmitted with the data frame by the time division transmit engine 240 over a port designated by the time division arbiter 230.

After the time division transmit engine 240 transmits a data frame, the designated transmit port typically remains idle during an Interframe gap period. In an advantageous embodiment, the Interframe gap period for each port does not occur simultaneously. The time division transmit engine 240, therefore, may begin processing on another port during the Interframe gap period of the transmitted port. Instead of transmitting another data frame, the time division transmit engine 240 may also enter a wait state if it detects the media is not idle.

Typically, the time division transmit engine 240 may throughput the data frames to a multiplexer. In a preferred embodiment, the time division transmit engine 240 may throughput the data frames to a Serial Media Independent Interface. In an advantageous embodiment, the time division transmit engine 240 may throughput data to a multiplexer when transmitting the header, the data, the cyclic redundancy check and when padding. The time division transmit engine 240 may transmit data using a port in a full duplex mode or in a half duplex mode. If the port is a half duplex mode, then the time division transmit engine 240 may employ a wait state since the port can not transmit or receive simultaneously.

The transmit state table 250 may provide storage for the state of each particular port. The transmit state table 250 may be coupled to the time division transmit engine 240 and store the initial state of each port and a new state of each port after processing by the time division transmit engine 240. In one embodiment, the transmit state table 250 may be implemented by employing conventional registers. In another embodiment, the transmit state table 250 may employ random access memory. The transmit state table 250 may be similar in operation and construction to the receive state table 220.

Figure 3:
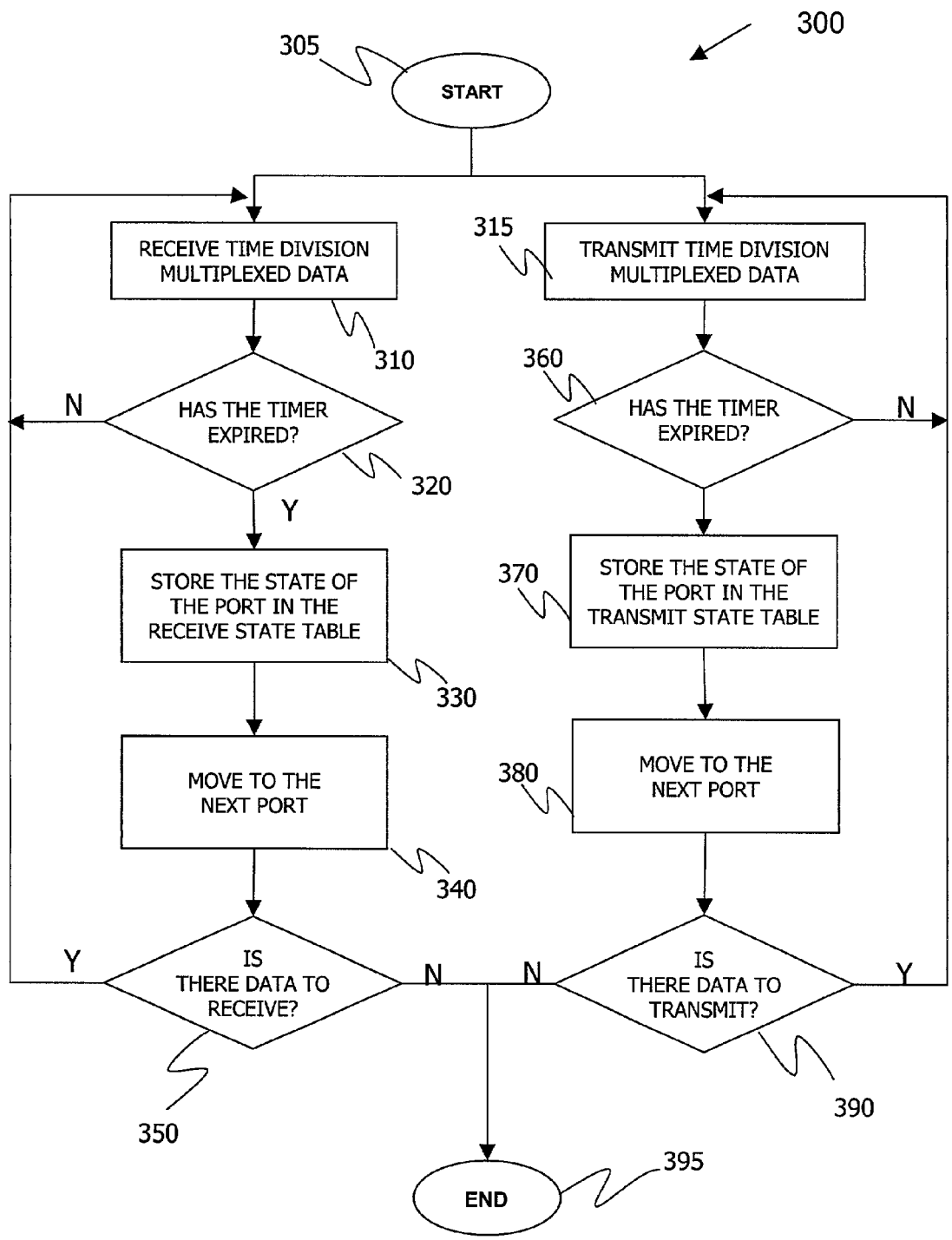
FIG. 3 illustrates a flow diagram of an embodiment of a method of controlling media access based on time division constructed in accordance with the principles of the present invention.

Turning to FIG. 3, illustrated is a flow diagram of an embodiment of a method of controlling media access based on time division, generally designated 300, constructed in accordance with the principles of the present invention. The method starts in a step 305 with an intent to control media access.

After starting, a time division media access controller receives time division multiplexed data in a step 310. Typically, a physical layer device collects data from a plurality of ports and sends the data to a multiplexer such as a Serial Media Independent Interface (SMII). In an advantageous embodiment, the plurality of ports may be about 48 ports. The SMII may receive serialized data received from one of the plurality of ports and send the received data as time division multiplexed data to a time division receive engine of the time division media access controller. The time division multiplexed data may be received by the time division receive engine through a 128 bit wide bus.

The time division receive engine receives the time division multiplexed data based on a receive state table coupled to the time division receive engine. In some embodiments, the receive state table may employ registers or random access memory. In one embodiment, the received data may be associated with an Internet Protocol (IP) structure. In another embodiment, the received data may be associated with a Transmit Control Protocol (TCP) structure. In a preferred embodiment, the received data may be IEEE 802.3 ethernet frames.

The time division media access controller also transmits time division multiplexed data in a step 315. A time division transmit engine of the time division media access controller may transmit the time division multiplexed data to the SMII. Typically, the time division multiplexed data may be received by the time division transmit engine from a conventional Layer 2 or Layer 3 switch engine. In an advantageous embodiment, the time division multiplexed data may be received by the time division transmit engine through a 128 bit wide bus.

The time division transmit engine receives the time division multiplexed data based on a transmit state table coupled to the time division transmit engine. In some embodiments, the transmit state table may employ registers or random access memory. As one skilled in the art will understand, the time division media access controller may simultaneously receive and transmit time division multiplexed data. In the following discussion, receiving time division multiplexed data will be discussed before discussing transmitting the time division multiplexed data.

After receiving the time division multiplexed data, the time division media access controller determines if the timer has expired for processing the received data in a first decisional step 320. In a preferred embodiment, an arbiter of the time division media access controller directs the processing of the received time division multiplexed data by controlling the states of the time division receive engine based on the throughput requirements of the received data. In arbitrating, the arbiter may employ a round-robin architecture. A conventional timer may be used to process the time division multiplexed data received on one of the plurality of ports. The time division receive engine may process the time division multiplexed data for a designated period as determined by the arbiter. This designated period may be based on the number of the plurality of ports and the clock speed of the time division media access controller. Typically, there may be several passes before the processing of the data is completed.

After the timer has expired, the time division media access controller stores the state of the port being processed in a receive state table in a step 330. In a preferred embodiment, the arbiter controls storing the state of the port. The time division media access controller then proceeds to a next port in a step 340.

After proceeding to the next port, the time division media access controller determines if there is data to receive in a second decisional step 350. If there is no data to receive, the method ends in a step 395.

Returning now to the first decisional step 320, if the timer has not expired, then the method proceeds to step 310 and continues as before. In addition, returning to step 350, if there is data to receive, then the method proceeds to step 310 and continues as before.

Now discussing transmitting time division multiplexed data, after transmitting the data in the step 315, the time division media access controller determines if the timer has expired for processing the transmitted data in a third decisional step 360. In a preferred embodiment, an arbiter of the time division media access controller directs the processing of the transmitted time division multiplexed data by controlling the states of the time division receive engine based on the throughput requirements of the transmitted data. In arbitrating, the arbiter may employ a round-robin architecture. A conventional timer may be used to process the time division multiplexed data transmitted on one of the plurality of ports. The time division transmit engine may process the time division multiplexed data for a designated period as determined by the arbiter. As discussed above with respect to receiving, the designated period may be based on the number of the plurality of ports and the clock speed of the time division media access controller. Typically, there may be several passes before the processing of the data is completed.

After the timer has expired, the time division media access controller stores the state of the port being processed in a transmit state table in a step 370. The arbiter may control the storage of the state information in the transmit state table. The time division media access controller then proceeds to a next port in a step 380.

After proceeding to the next port, the time division media access controller determines if there is data to transmit in a fourth decisional step 390. In an advantageous embodiment, the data to transmit may be received from a conventional Layer 2 or Layer 3 switch engine. If there is no data to transmit, the method ends in a step 395.

Returning now to the third decisional step 360, if the timer has not expired, then the method proceeds to step 315 and continues as before. In addition, returning to step 390, if there is data to transmit, then the method proceeds to step 315 and continues as before.

Although the present invention has been described in detail, those skilled in the art should understand that they can make various changes, substitutions and alterations herein without departing from the spirit and scope of the invention in its broadest form.

What is claimed is:

1. A time division media access controller for use with a multi-port data switch, comprising:
   a time division receive engine configured to accept data from a plurality of data ports;
   a time division transmit engine configured to provide data through a plurality of data ports;
   a receive state table coupled to said time division receive engine;
   a transmit state table coupled to said time division transmit engine; and
   a time division arbiter, coupled to said time division receive and transmit engines, configured to control states of said time division receive and transmit engines based on throughput requirements of said data, said time division arbiter further comprising a timer that initiates, as a function of a setting or an expiration of said timer for an allotted time, said allotted time comprising a plurality of clock cycles, a save of a state of a data port of said plurality of data ports at at least one of said receive state table and said transmit state table.

2. The time division media access controller as recited in claim 1 wherein said plurality of ports is about 48 ports.

3. The time division media access controller as recited in claim 1 wherein said time division media access controller employs a serial media independent interface.

4. The time division media access controller as recited in claim 1 wherein said data is accepted and provided through a 128 bit wide data bus.

5. The time division media access controller as recited in claim 1 wherein said data is IEEE 802.3 ethernet frames.

6. The time division media access controller as recited in claim 1 wherein said time division arbiter employs a round-robin architecture.

7. A method of controlling media access based on time division for use with a multi-port data switch, comprising:
   receiving time division multiplexed data from a plurality of data ports based on a receive state table coupled to a time division receive engine;
   transmitting time division multiplexed data through a plurality of data ports based on a transmit state table coupled to a time division transmit engine; and
   arbitrating said receiving and said transmitting by controlling states of said time division receive and transmit engines based on throughput requirements of said data, said arbitrating further comprising saving, as a function of a setting or an expiration of a timer for an allotted time, said allotted time comprising a plurality of clock cycles, a state of a data port of said plurality of data ports at least one of said receive state table and said transmit state table.

8. The method as recited in claim 7 wherein said plurality of ports is about 48 ports.

9. The method as recited in claim 7 wherein said receiving and said transmitting employs a serial media independent interface.

10. The method as recited in claim 7 wherein said receiving and said transmitting employs a 128 bit wide data bus.

11. The method as recited in claim 7 wherein said receive and transmit state tables employ registers.

12. The method as recited in claim 7 wherein said data is IEEE 802.3 ethernet frames.

13. The method as recited in claim 7 wherein said arbitrating employs a round-robin architecture.

14. A data switch, comprising:
   a switch engine coupled to an address table;
   a static dynamic random memory (SDRAM) interface coupled to said switch engine;
   a multiplexer; and
   a time division media access controller coupled to said switch engine and said multiplexer, including:
      a time division receive engine, coupled to a receive state table, that accepts data from a plurality of data ports;
      a time division transmit engine, coupled to a transmit state table, that provides data through a plurality of data ports; and
      a time division arbiter, coupled to said receive and transmit state tables, that controls states of said time division receive and transmit engines based on throughput requirements of said data, said time division arbiter further comprising a timer that initiates, as a function of a setting or an expiration of said timer of an allotted time, said allotted time comprising a plurality of clock cycles, a save of a state of a data port of said plurality of said data ports.

15. The data switch as recited in claim 14 wherein said plurality of ports is about 48 ports.

16. The data switch as recited in claim 14 wherein said multiplexer may be a serial media independent interface.

17. The data switch as recited in claim 14 wherein said data is accepted and provided through a 128 bit wide data bus.

18. The data switch as recited in claim 14 wherein said receive and transmit state tables employ registers.

19. The data switch as recited in claim 14 wherein said data is IEEE 802.3 ethernet frames.

20. The data switch as recited in claim 14 wherein said time division arbiter employs a round-robin architecture.

21. The data switch as recited in claim 14, wherein said timer initiates, as said function of said setting or said expiration of said timer of said allotted time, said save of said state of said data port of said plurality of said data ports at least one of said receive state table and said transmit state table.

* * * * *